United States Patent
Bastide et al.

(10) Patent No.: US 10,241,996 B2
(45) Date of Patent: Mar. 26, 2019

(54) SHARED USER CONTEXT FOR EFFICIENT CONVERSATIONS

(71) Applicant: International Business Machines Corporation, Armonk, NY (US)

(72) Inventors: Paul R. Bastide, Boxford, MA (US); Matthew E. Broomhall, Goffstown, NH (US); Robert E. Loredo, North Miami Beach, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/244,230

(22) Filed: Aug. 23, 2016

(65) Prior Publication Data

US 2018/0060299 A1    Mar. 1, 2018

(51) Int. Cl.
  *G06F 17/27* (2006.01)
  *H04L 12/58* (2006.01)
  *H04L 29/08* (2006.01)

(52) U.S. Cl.
  CPC .......... *G06F 17/2765* (2013.01); *H04L 51/14* (2013.01); *H04L 51/32* (2013.01); *H04L 67/306* (2013.01)

(58) Field of Classification Search
  None
  See application file for complete search history.

(56) References Cited

U.S. PATENT DOCUMENTS

| | | | |
|---|---|---|---|
| 8,195,668 B2 * | 6/2012 | Drennan | G06Q 30/02 705/319 |
| 8,543,654 B2 | 9/2013 | Schindler et al. | |
| 9,247,066 B1 | 1/2016 | Stec et al. | |
| 9,558,271 B1 * | 1/2017 | Sathe | G06F 17/30734 |
| 2010/0077032 A1 * | 3/2010 | Drennan | G06Q 50/01 709/206 |
| 2012/0095997 A1 | 4/2012 | Nice et al. | |
| 2013/0287187 A1 | 10/2013 | Gandhe et al. | |
| 2014/0006490 A1 | 1/2014 | Setlur et al. | |
| 2014/0047051 A1 * | 2/2014 | Li | H04L 67/02 709/206 |
| 2015/0269136 A1 | 9/2015 | Alphonso et al. | |
| 2016/0014151 A1 * | 1/2016 | Prakash | H04L 63/1483 726/22 |
| 2016/0043987 A1 | 2/2016 | Ahn et al. | |
| 2016/0235374 A1 * | 8/2016 | Miller | A61B 5/7275 |
| 2017/0257329 A1 * | 9/2017 | Tetreault | H04L 51/046 |

* cited by examiner

*Primary Examiner* — Kevin Ky
(74) *Attorney, Agent, or Firm* — Cuenot, Forsythe & Kim, LLC

(57) ABSTRACT

An electronic message comprising text generated by a first user can be identified and at least a second user can be identified as a recipient. At least one n-gram contained in the text of the electronic message can be identified by performing natural language processing on the text. A first user profile of the first user and a second user profile of the second user can be accessed. Based on the first user profile and the second user profile, at least one shared user context of the first user and the second user relating to the at least one n-gram can be determined. The at least one shared user context of the first user and the second user relating to the at least one n-gram can be presented to at least the second user.

17 Claims, 4 Drawing Sheets

170

Bob: What's up with Product Z?

Bob: What's up with Product Z?  ← 310

Shared User Context(s): Z-Series, Java Developer, Software Group

Unshared User Context(s): Project Management
                           ↖ 320

Bob: What's up with Product Z?  ← 310

Shared User Context(s): Z-Series, Java Developer, Software Group

Unshared User Context(s): Software Development
                           ↖ 420

```
┌─────────────────────────────────────────────────────────────────────┐
│ Identify an electronic message comprising text generated by a first │
│              user and identifying at least a second user as a recipient │
│                                  505                                │
└─────────────────────────────────────────────────────────────────────┘
                                   │
                                   ▼
┌─────────────────────────────────────────────────────────────────────┐
│ Identify at least one n-gram contained in the text of the electronic│
│         message by performing natural language processing on the text │
│                                  510                                │
└─────────────────────────────────────────────────────────────────────┘
                                   │
                                   ▼
┌─────────────────────────────────────────────────────────────────────┐
│ Access a first user profile of the first user and a second user     │
│ profile of the second user and, based on the first user profile and │
│ the second user profile, determine, using a processor, at least one │
│ shared user context of the first user and the second user relating  │
│                        to the at least one n-gram                   │
│                                  515                                │
└─────────────────────────────────────────────────────────────────────┘
                                   │
                                   ▼
┌─────────────────────────────────────────────────────────────────────┐
│ Present, to at least the second user, the at least one shared user  │
│ context of the first user and the second user relating to the at    │
│                           least one n-gram                          │
│                                  520                                │
└─────────────────────────────────────────────────────────────────────┘
```

FIG. 5

SHARED USER CONTEXT FOR EFFICIENT CONVERSATIONS

BACKGROUND

The present invention relates to electronic communications.

Globally, the use of text based electronic communication, such as electronic mail (e-mail), text messaging, instant messaging and posts in social networking services, continues to grow. In comparison to use of traditional telephony services, the use of text based electronic communication oftentimes is more convenient. A user can quickly generate an electronic message and send it to one or more recipients, and the recipients can respond at their convenience. Moreover, a series of related text based electronic communications can be stored in thread. Users can review the thread to help recall various points discussed during a conversation.

SUMMARY

A method includes identifying an electronic message comprising text generated by a first user and identifying at least a second user as a recipient. The method also can include identifying at least one n-gram contained in the text of the electronic message by performing natural language processing on the text. The method also can include accessing a first user profile of the first user and a second user profile of the second user and, based on the first user profile and the second user profile, determining, using a processor, at least one shared user context of the first user and the second user relating to the at least one n-gram. The method also can include presenting, to at least the second user, the at least one shared user context of the first user and the second user relating to the at least one n-gram.

A system includes a processor programmed to initiate executable operations. The executable operations include identifying an electronic message comprising text generated by a first user and identifying at least a second user as a recipient. The executable operations also can include identifying at least one n-gram contained in the text of the electronic message by performing natural language processing on the text. The executable operations also can include accessing a first user profile of the first user and a second user profile of the second user and, based on the first user profile and the second user profile, determining at least one shared user context of the first user and the second user relating to the at least one n-gram. The executable operations also can include presenting, to at least the second user, the at least one shared user context of the first user and the second user relating to the at least one n-gram.

A computer program includes a computer readable storage medium having program code stored thereon. The program code is executable by a processor to perform a method. The method includes identifying, by the processor, an electronic message comprising text generated by a first user and identifying at least a second user as a recipient. The method also can include identifying, by the processor, at least one n-gram contained in the text of the electronic message by performing natural language processing on the text. The method also can include accessing, by the processor, a first user profile of the first user and a second user profile of the second user and, based on the first user profile and the second user profile, determining, by the processor, at least one shared user context of the first user and the second user relating to the at least one n-gram. The method also can include presenting, by the processor, to at least the second user, the at least one shared user context of the first user and the second user relating to the at least one n-gram.

BRIEF DESCRIPTION OF THE DRAWINGS

FIG. 2 depicts an example of an electronic message.

FIG. 3 depicts another example of the electronic message of FIG. 2.

FIG. 4 depicts another example of the electronic message of FIG. 2.

FIG. 5 is a flow chart illustrating an example of a method of presenting a shared user context to a user.

DETAILED DESCRIPTION

Figure 1:
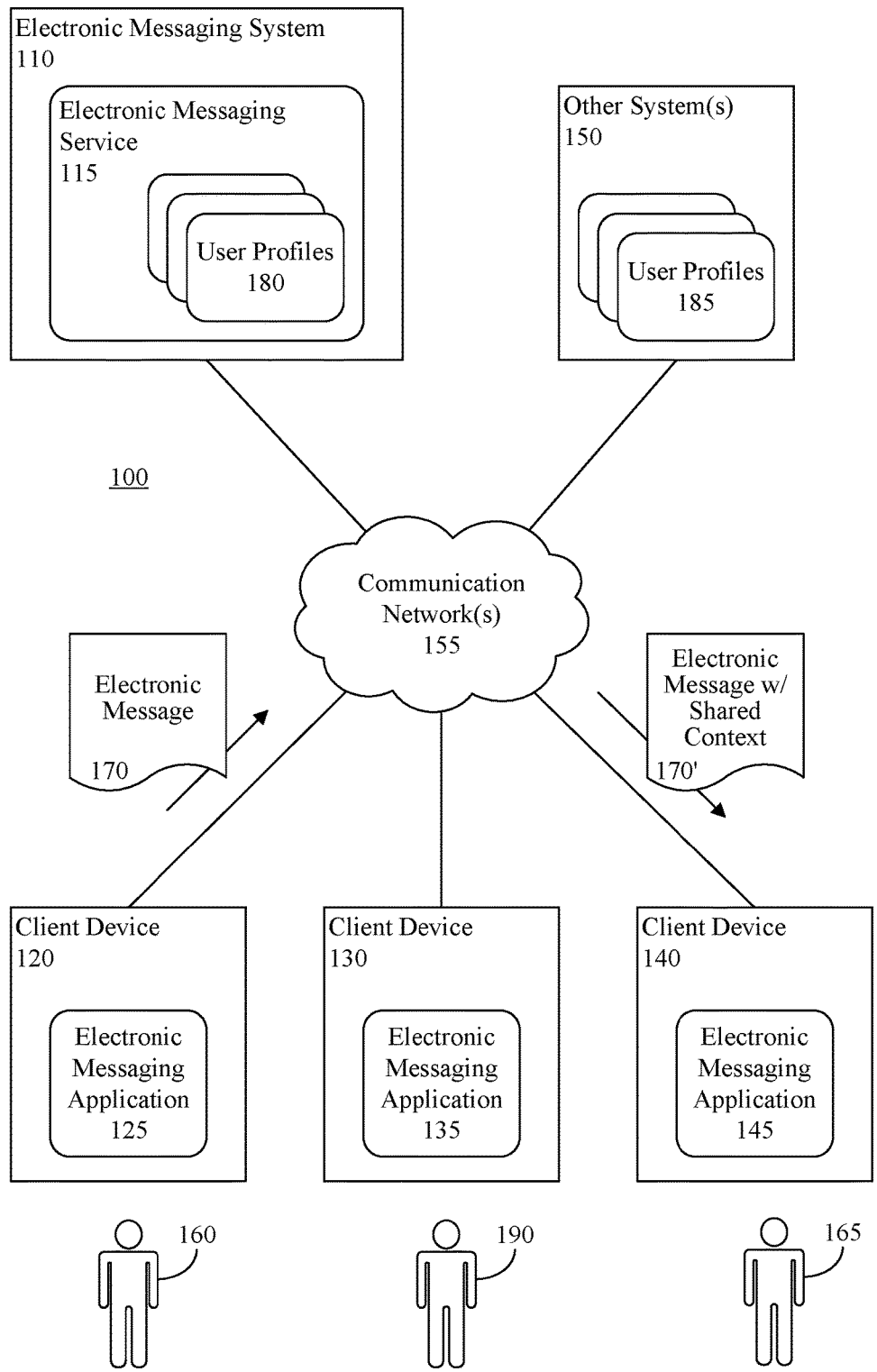
FIG. 1 is a block diagram illustrating an example of a computing environment.

This disclosure relates to electronic communications. In accordance with the inventive arrangements disclosed herein, a first user can generate an electronic message to be sent to a second user. A processing system can determine at least one shared user context of the first user and the second user and, optionally, at least one unshared user context. The processing system can present the shared and unshared user contexts to the second user, for example by automatically adding additional text to the electronic message indicating the shared and unshared user contexts. Such user contexts can help the second user quickly understand the context of electronic message, and thus better determine how to respond to received electronic message.

Several definitions that apply throughout this document now will be presented.

As defined herein, the term "user context" means information about a user's experience, expertise and/or interest. Examples of "user context" include, but are not limited to, projects to which a user is or has been assigned, an area of expertise and/or experience of a user, a company and/or department in which a user works or has worked, an interest of a user, an endorsement a user has received relating to the user's experience and/or expertise, and so on.

As defined herein, the term "shared user context" means user context that is the same for at least two users. In illustration, if user A and user B both work on the same project, that project is a shared user context of users A and B. If user A and user B both have expertise in a particular computer programming language, that programming language is a shared user context of users A and B. If user A and user B both have an interest in a certain type of vehicle, that type of vehicle is a shared user context of users A and B. Those of ordinary skill in the art will appreciate that are numerous other examples of "shared user context" within the scope of the present arrangements.

As defined herein, the term "unshared user context" means user context that is not the same for at least two users. In illustration, if user A has an expertise in a particular computer programming language, but user B does not have such expertise, this expertise is an unshared user context of user A. Similarly, if user A has an interest in a particular type of activity, but user A does not have such interest, this interest is an unshared user context of user A. Those of ordinary skill in the art will appreciate that are numerous other examples of "unshared user context" within the scope of the present arrangements.

As defined herein, the term "electronic message" means an electronic mail (e-mail), a text message or a post in a social networking service.

As defined herein, the term "e-mail" means an electronic mail delivered via a communication network to at least one user. An e-mail may be sent by one user to one or more other users. In this regard, an e-mail typically identifies at least recipient using a user name (e.g., e-mail address) corresponding to the recipient, or a group name corresponding to a group of recipients, in at least field within the e-mail, for example within a "To" field, "Cc" field and/or "Bcc" field in a header of the e-mail. A recipient may view an e-mail via an e-mail client, which may execute on a client device or a server to which a client device is communicatively linked.

As defined herein, the term "text message" means an electronic message comprising text delivered via a communication network to at least one user identified as a recipient. A text message may be sent by one user to one or more other users. In this regard, a text message typically identifies at least one recipient using a user name, telephone number or the like. A text message also may comprise audio, image and/or multimedia content. A text message can be delivered, for example, using the short message service (SMS), the text messaging service (TMS) and/or the multimedia messaging service (MMS). A text message also may be referred to as an "instant message." As defined herein, a text message itself is not a result generated by an Internet search engine per se, although a text message may contain one or more uniform resource identifiers, such as hyperlinks, which can be generated by an Internet search engine and copied, for example by a user (e.g., sender), into the text message. In this regard, if a user uses a web browser to access an Internet search engine to perform an Internet search, and the user receives results from the Internet search engine in the web browser, such results are not a text message as the term text message is defined herein.

As defined herein, the term "social networking service" means an online service platform on which social networks or social relations are built among people who, for example, share interests, activities, backgrounds or real-life connections, and via which people can share information with one another. As the term "social networking service" is defined herein, a messaging service per se (e.g., an e-mail service, a text messaging service, or an instant messaging service) is not a social networking service, though a social networking service can include an e-mail messaging service, a text messaging service and/or an instant messaging service in addition to one or more social networking components.

As defined herein, the term "n-gram" means contiguous sequence of n items in a sequence of text, wherein the items are phonemes, syllables, letters, words and/or base pairs. An n-gram of size 1 may be referred to as a unigram, an n-gram of size 2 may be referred to as a bigram or digram, an n-gram of size 3 may be referred to as a trigram, an n-gram of size 4 may be referred to as a four-gram, an n-gram of size 5 may be referred to as a five-gram, and so on.

As defined herein, the term "client device" means a processing system including at least one processor and memory that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

As defined herein, the term "natural language analysis" means a process that derives a computer understandable meaning of a human language.

As defined herein, the term "human language" is a language spoken or written by human beings that is not a computer programming language. A "human language" may be referred to as a "natural language."

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

FIG. 1 is a block diagram illustrating an example of a computing environment 100. The computing environment 100 can include an electronic messaging system 110 and a plurality of client devices 120, 130, 140. Optionally, the computing environment also can include one or more other systems 150 (e.g., servers or network attached storages). The electronic messaging system 110, client devices 120-140 and other systems 150 can be communicatively linked via at least one communication network 155. The communication network 155 is the medium used to provide communications links between various devices and data processing systems connected together within computing environment 100. The communication network 155 may include connections, such as wire, wireless communication links, or fiber optic cables. The communication network 155 can be implemented as, or include, any of a variety of different communication technologies such as a WAN, a LAN, a wireless network, a mobile network, a Virtual Private Network (VPN), the Internet, the Public Switched Telephone Network (PSTN), or similar technologies.

The electronic messaging system 110 can include at least one processor and memory. For example, the electronic messaging system 110 can be implemented using a server, or one or more servers that are communicatively linked. The electronic messaging system 110 can host an electronic messaging service 115 that provides electronic messaging services to the client device for example an e-mail service, a text messaging service 115 (e.g., SMS, TMS, MMS or instant messaging service) or a social networking service. The electronic messaging service 115 can execute in a software execution environment provided by an operating system executed by the electronic messaging system.

Each client device 120, 130, 140 can execute a respective electronic messaging application 125, 135, 145, for example within a software execution environments provided by respective operating systems executed by the client devices 120-140. Examples of electronic messaging applications 125-145 include, but are not limited to, e-mail clients, text messaging clients, instant messaging clients, collaboration applications, mobile applications, or any other applications via which a user may communicate electronic messages. In one arrangement, one or more of the electronic messaging applications 125-145 can be implemented as web browsers used to access the electronic messaging service 115. For example, a web browser can be used to access and execute a web based application configured to support communication of electronic messages.

In operation, a user 160 of the client device 120 can generate, using the electronic messaging application 125, an electronic message 170 indicating at least one recipient, for example a user 165 of the client device 140. For simplicity, the following description may refer to the user 165 as being the recipient of the electronic message 170, but those of ordinary skill in the art will appreciate that additional users also can be recipients of the electronic message 170, and the following described processes can be implemented for each of the recipients or a portion of the recipients. For example, the described processes can be implemented for users who are actively participating in a conversation to which the electronic message 170 pertains, while not being implemented for users merely following the conversation but not participating in the conversation. The present arrangements, however, are not limited in this regard.

Responsive to the user 160 generating the electronic message 170, attempting to send or post the electronic message 170, sending the electronic message 170, or responsive to the user selecting a menu item, button or icon presented by the electronic messaging application 125, the electronic messaging service 115 can identify one or more shared user contexts among the users 160, 165. Optionally, the electronic messaging service 115 also can identify one or more user contexts not shared among the users 160, 165. The electronic messaging service 115 can present the shared user contexts and, optionally, unshared user contexts of the user 160, to the user 165. Further, the electronic messaging service 115 can present the shared user contexts and, optionally, unshared user contexts of the user 165, to the user 160.

In one arrangement, the electronic messaging service 115 can present the shared user context(s) and, optionally, the unshared user context(s) by adding such user contexts to the electronic message 170. For example, the electronic messaging service 115 can present the user contexts in a body of the electronic message 170. In illustration, the electronic messaging service 115 can add the shared user contexts and unshared user contexts of the user 160 to an instance of the electronic message 170' communicated to the client device 140 and presented by the electronic messaging application 145. The user 165 can view the electronic message 170', including the shared user contexts and, optionally, the unshared user contexts via the electronic messaging application 145. As noted, such user contexts can help the user 165 quickly understand the context of electronic message 170, and thus better determine how to respond to received electronic message. For example, if the electronic message asks "What about Product Z," and the shared user contexts include "Product Z developer" the user 165 can infer that the question is asking about progress at developing Product Z. In another example, if the electronic message asks "What about Product Z," and the unshared user contexts includes "software acquisition specialist" the user 165 can infer that the question is asking about a purchase of Product Z.

The electronic messaging service 115 also can add the shared user contexts and unshared user contexts of the user 165, and any other recipients of the electronic message 170, if any, to an instance of the electronic message 170 retained for the user 160. For example, the electronic messaging service 115 can add such user contexts to the electronic message 170 and return such instance of the electronic message 170 to the client device 120 (e.g., to the electronic messaging application 125). The user 160 can view the electronic message 170, including the shared user contexts and, optionally, the unshared user contexts via the electronic messaging application 125. Accordingly, the user 160 can gain an understanding of user 165, and whether the user 165 may provide a suitable response to the electronic message 170, even before the user 165 actually responds.

In another arrangement, the electronic messaging service 115 can present the shared user context(s) and, optionally, the unshared user context(s) in another manner, for example by adding metadata including such user contexts to the electronic message 170. The electronic messaging applications 125, 145 can process the metadata when presenting the electronic message 170 and, responsive to such processing, present the user contexts to the respective users 160, 165. In illustration, the electronic messaging service 115 can present the shared user context(s) and, optionally, the unshared user context(s) in a pop up window presented when the electronic message 170 is opened. In another arrangement, the electronic messaging service 115 can present the shared user context(s) and, optionally, the unshared user context(s) in a view presenting a listing of electronic messages including the electronic message 170. In this arrangement, the user contexts can be presented immediately next to, or near, information presented in the view identifying the electronic message 170, for instance in a field on a same line as a field in which the electronic message 170 identifying information is presented.

To determine the shared user contexts and the unshared user contexts, the electronic messaging service 115 can, responsive to the user 160 attempting to send the electronic message 170 or generating the electronic message 170, identify the electronic message 170 in real time. For example, the electronic messaging application 125 can interface with the electronic messaging service 115 to indicate to the electronic messaging service 115 the electronic message 170. In illustration, responsive to the user 160 initiating sending of the electronic message 170, the electronic messaging application 125 can communicate the electronic message 170 to the electronic messaging service 115. In another example, responsive to the user 160 generating the electronic message 170 and selecting a particular menu item, button or icon, the electronic messaging application 125 can communicate to the electronic messaging service 115 data contained in the electronic message 170. Such data can include a user identifier for the user 160, user identifiers for one or more recipients of the electronic message 170, and text in a subject line and body of the electronic message 170.

Responsive to identifying the electronic message 170, the electronic messaging service 115 can process text contained in subject and body of the electronic message 170 to identify one or more n-grams contained in the text. To identify the n-grams, the electronic messaging service 115 can perform natural language processing (NLP) and semantic analysis on the text. NLP is a field of computer science, artificial intelligence and linguistics which implements computer processes to facilitate interactions between computer systems and human (natural) languages. NLP enables computers to derive computer-understandable meaning from natural language input. The International Organization for Standardization (ISO) publishes standards for NLP, one such standard being ISO/TC37/SC4. Semantic analysis is the implementation of computer processes to generate computer-understandable representations of natural language expressions. Semantic analysis can be used to construct meaning representations, semantic underspecification, anaphora resolution, presupposition projection and quantifier scope resolution, which are known in the art. Semantic analysis is frequently used with NLP to derive computer-understandable meaning from natural language input. An unstructured information management architecture (UIMA), which is an industry standard for content analytics, may be used by the electronic messaging service 115 to implement NLP and semantic analysis.

Responsive to identifying the n-gram(s) contained in the text, the electronic messaging service 115 can access one or more user profiles 180, 185 of the user 160 who generated the electronic message 170 and one or more of the recipients (e.g., the user 165) to whom the electronic message 170 is to be sent. From the user profiles 180, 185, the electronic messaging service 115 can identify user contexts for each of the users 160, 165, including user contexts that pertain to a subject of the electronic message 170 and, optionally, other user contexts. The user profiles 180 may be stored by, or managed by, the electronic messaging service 115. The user profiles 185 may be stored by, or managed by, one or more other systems 150. By way of a non-limiting example, the electronic messaging service 115 can be an e-mail service that stores and manages the user profiles 180, and another system 150 can host a social networking service that stores and manages the user profiles 185. As noted, examples of the user contexts may include, but are not limited to, projects to which the users 160, 165 are or have been assigned, area of expertise and/or experience of the users 160, 165, companies and/or departments in which the users 160, 165 work or have worked, interests of the users 160, 165, endorsements the users 160, 165 have received relating to their experience and/or expertise, and so on.

Using NLP and semantic analysis, the electronic messaging service 115 can determine which of the identified user contexts pertain to a topic of the electronic message 170. In illustration, the electronic messaging service 115 can use NLP and semantic analysis to process the user contexts and n-grams contained in the text of the electronic message 170 in order to determine a level of correlation between each user context and the n-grams. Each user context having a level of correlation that exceeds a threshold value can be determined to relate to an n-gram contained in the electronic message 170, and thus pertain to a topic of the electronic message 170. For example, if an n-gram identifies a software product, and a user context indicates software development, that user context can be determined to relate to that n-gram, and thus pertain to a topic of the electronic message 170. In this regard, the electronic messaging service 115 can store, or access, one or more databases correlating various n-grams to their meanings and correlating various user contexts to their meanings. In a further arrangement, the electronic messaging service 115 can interface with a cognitive system, for example IBM® Watson, which can be configured to determine levels of correlation between user contexts and n-grams.

In one aspect, the electronic messaging service 115 can limit identification of user contexts that are not older than a threshold value. By way of example, at least some of the user contexts can have associated date/time stamps and/or metadata indicating when the user contexts were entered into the user profiles 180, 185. The electronic messaging service 115 can ignore those user contexts having dates that are older than the threshold value (e.g., added to the user profiles 180, 185 more than six months ago, one year ago, two years ago, three years ago and so on.).

From among the identified user contexts, the electronic messaging service 115 can determine which user contexts for the users 160, 165 are the same (e.g., exactly the same or similar), and identify those user contexts as shared user contexts. For instance, the electronic messaging service 115 can use NLP and semantic analysis to determine which user contexts are the same. In illustration, a user context of user 160 can be "XYZ software developer" and a user context of user 165 can be "software development using XYZ." The electronic messaging service 115 can determine that these user contexts are the same and thus are a shared user context. Further, the electronic messaging service 115 can determine which of the shared user contexts pertain to a topic of the electronic message 170 and which shared user contexts do not.

The electronic messaging service 115 can determine which user contexts for the users 160, 165 are not the same, and thus are unshared user contexts. For example, if a user context of the user 160 is "software procurement" and a user context of the user 165 is "software developer," the electronic messaging service 115 can determine that each of these user contexts are unshared user contexts. Again, the electronic messaging service 115 can determine which unshared user contexts pertain to a topic of the electronic message 170 and which do not.

In one arrangement, in presenting the shared user contexts, the electronic messaging service 115 can indicate which shared user contexts pertain to a topic of the electronic message 170 and indicate which shared user contexts do not. Similarly, in presenting the unshared user contexts, the electronic messaging service 115 can indicate which unshared user contexts pertain to a topic of the electronic message 170 and indicate which unshared user contexts do not. In another arrangement, the electronic messaging service 115 can present only shared user contexts that pertain to a topic of the electronic message 170. Similarly, the electronic messaging service 115 can present only unshared user contexts that pertain to a topic of the electronic message 170. In yet another arrangement, the electronic messaging service 115 can indicate one or more shared user contexts and, optionally, one or more unshared user contexts without an indication of whether they pertain to a topic of the electronic message 170.

In one aspect of the present arrangements, responsive to the user 160 attempting to send or post the electronic message 170, the electronic messaging service 115 can perform the above processes to determine shared user contexts and, optionally, unshared user contexts, but instead of immediately sending the electronic message 170 to the user 165 or posting the electronic message 170, the electronic messaging service 115 can determine whether a threshold level of shared user contexts are determined. The threshold level of shared user contexts can be a default value, can be a value set by the user 165, a value set by an administrator of the electronic messaging service 115, or a value set in another suitable manner.

Responsive to determining that the threshold level of shared user contexts are not determined, the electronic messaging service 115 can prompt the user 160 revise the electronic message 170. For example, the electronic messaging service 115 can communicate a prompt to the electronic messaging application 125, which can present the prompt to the user, for example in a pop up window. In illustration, the prompt can suggest to the user 160 to clarify the text of the electronic message 170, and thus establish a minimum level of shared user contexts, to better facilitate understanding of the electronic message 170 by the user 165. The electronic messaging service 115 also can perform this process responsive to the user 160 selecting a menu item, button or icon presented by the electronic messaging application 125 prior to attempting to send or post the electronic message 170. Responsive to receiving the prompt, the user 160 can choose to revise the electronic message 170 or send the electronic message 170 without revision. In one non-limiting arrangement, the electronic messaging service 115 can prevent sending of the electronic message 170 until the electronic message 170 has been revised and a threshold number of shared user contexts have been identified.

In another arrangement, the electronic messaging service 115 can automatically add, or suggest to the user 160 to add, one or more other users as recipients of the electronic message 170. In the case that the electronic messaging service 115 suggest to the user to add one or more other users as recipients, the electronic messaging service 115 can communicate a prompt to the electronic messaging application 125, which can present the prompt to the user, for example in a pop up window. Responsive to the user selecting to add at least one other user, the electronic messaging service 115 or electronic messaging application 125 can add the other user(s) to the electronic message 170. The other user(s) can help bridge the conversation between the user 160 and the user 165, for example by helping to facilitate understanding by the user 165 of the text and/or other content contained electronic message 170, facilitate understanding by the user 160 of an electronic message generated by the user 165 in response to the electronic message 170, add additional information to the conversation, etc.

In illustration, if the number of shared user contexts, or a number of shared user contexts that pertain to a topic of the electronic message 170, does not meet or exceed a threshold value, the electronic messaging service 115 can identify at least one other user, for instance a user 190 of the client device 130, that has the threshold number of shared user contexts or shared user contexts that pertain to a topic of the electronic message 170. The electronic messaging service 115 can add, or suggest addition of, that user 190 as a recipient of the electronic message 170. To identify the user contexts of the user 190, the electronic messaging service 115 can access one or more user profiles 180, 185 of the user 190, for example as previously described.

In one aspect, the electronic messaging service 115 can identify other users who meet certain criteria and process each of their user contexts. The electronic messaging service 115 can determine the number of user contexts, or user contexts that pertain to a topic of the electronic message 170, which those other users share with the user 165. The electronic messaging service 115 can select the user 190 responsive to determining that the user has a highest level of, or otherwise meets a threshold value, of the shared user contexts. The criteria used to identify the other users can include, for example, a department and/or company in which the other users work, availability of the other users (e.g., whether the users are presently in the office, whether the users are indicated as being available, when the other users are available, etc.), positions of the other users in an organizational hierarchy, whether the user contexts of the users indicate they have expertise or experience related to the topic of the electronic message 170, and so on.

In a further arrangement, the process of identifying shared user contexts and optionally, unshared user contexts, can be selectively implemented based on one or more conditions. In illustration, via the electronic messaging application 125, the user 160 can select or enter user settings indicating conditions requisite for processes to be implemented. An example of such a condition is that the user is involved in a threshold number of presently active conversations taking place via electronic messaging. For instance, the processes can be implemented if the user 160 has sent/posted and received electronic messages over a particular period of time (e.g., within the last hour, the last two hours, the last three hours, the last four hours, the last day, and so on) in a threshold number of electronic messaging conversations. An electronic messaging conversation can be, for example, a plurality of posts in a thread of a social networking service, a plurality of related e-mails or text messages, etc. Another example of a condition is that the user 160 has sent and/or received a threshold number of electronic messages within a particular period of time. A further example of a condition is whether the recipient(s) of the electronic message 170 meet certain criteria. For instance, the user 160 may choose to implement the processes only if the user 165 is not indicated in a contact list of the user 160, if a user 165 does not work in the same department and/or company as the user 160, and so on.

In another arrangement, the electronic messaging service 115 can present to the user 160 an indication of the likelihood the user 165 will respond to the electronic message 170 and/or a prediction of how long it will take the user 165 to respond to the electronic message 170. For example, the electronic messaging service 115 can identify electronic messages received by the user 165 over a particular period of time (e.g., the last day, the last week, the last month, the last year, and so on) and identify electronic messages sent by the user 165 responding to the received electronic messages. The electronic messaging service 115 can determine a period of time (e.g., a number of minutes, hours, days, weeks, etc.) between a date/time each received electronic message is received and a date/time the user 165 sent or posted an electronic message in response. The electronic messaging service 115 can process the respective periods of time to determine the prediction of how long it will take the user 165 to respond to the electronic message 170. For instance, the electronic messaging service 115 can determine an average of the time periods.

In one arrangement, the prediction of how long it will take the user 165 to respond to the electronic message 170 further can be based on the content (e.g., text, images, video, etc.) contained in the electronic message 170, the sender of the electronic message 170 (i.e., the user 160), and/or other recipients copied on the electronic message 170 (e.g., other recipients indicated in a "To" field, a "Cc" field and/or a "Bcc" field). In illustration, if the electronic messaging service 115 can categorize the electronic message 170 based on any of a variety of aspects of the electronic message 170, for example a volume of text contained in the electronic message 170, whether one or more attachments are attached to the electronic message 170, one or more topics of the electronic message 170, a sentiment expressed in the electronic message 170, other recipients copied on the electronic message 170, and so on. The electronic messaging service 115 can determine the prediction of how long it will take the user 165 to respond to the electronic message 170 based on processing respective periods of time it took the user 165 to respond to other electronic messages that were assigned to the same category of the electronic message 170. The electronic messaging service 115 can identify the topics of the electronic messages using NLP and semantic analysis. The electronic messaging service 115 can identify the sentiment of the electronic messages using NLP, semantic analysis and sentiment analysis, which is known in the art.

The user 165 may not always respond to certain types of electronic messages, for example electronic that fall within certain categories. The electronic messaging service 115 can determine a portion of electronic messages that are assigned to a same category as the electronic message 170 to which the user 165 has sent response electronic messages, and present the indication of the likelihood the user 165 will respond to the electronic message 170 based on that determination. For example, the electronic messaging service 115 can determine a percentage of such electronic messages, and indicate that percentage as the indication of the likelihood the user 165 will respond to the electronic message 170.

FIG. 2 depicts an example of an electronic message 170. For this example, assume that Alice, Bob and Charlie are members of a social network within a social networking service. Bob recently asked Charlie who to converse with regarding Project X and Product Z. Charlie tells Bob to converse with Alice. Accordingly, Bob generates the electronic message 170, indicating Alice as a recipient, and asks in the electronic message "What's up with Product Z?"

Referring to FIG. 3, the electronic messaging service 115 can perform the processes described herein to identify one or more shared user contexts 310 for Bob and Alice and one or more unshared user contexts 320. For example, the electronic messaging service 115 can identify the n-grams "What's up," "with," and "Product Z." Based on these n-grams, the electronic messaging service 115 can identify the topic of the electronic message 170 as being "Product Z." Further, accessing a database, the electronic messaging service 115 can determine that "Product Z" is a software product in a "Z-Series" of products and is implemented using the Java® programming language.

Further, the electronic messaging service 115 can identify Bob as the sender of the electronic message 170 and Alice as the recipient of the electronic message 170. The electronic messaging service 115 can access their respective user profiles 180, 185 and identify the following user contexts for Bob and Alice:

Bob: Java Developer, OAuth, Z-series, Project Management, Software Group, Ferraris, Scuba Diving
Alice: Z-series, Software Development, Java Developer, OAuth, Software Group, Hiking, Soccer, Fishing Both Bob and Alice have user contexts "Z-series," "Java Developer," "Software Group" and OAuth. Thus, the electronic messaging service 115 can determine that these are shared user contexts. Further, the electronic messaging service 115 can determine that the shared user contexts "Z-series," "Java Developer" and "Software Group" relate to the topic "Product Z," but the share user context "OAuth" does not. For example, the electronic messaging service 115 can make such determinations by accessing a database that correlates user contexts with various topics. In another arrangement, the electronic messaging service 115 can access a cognitive system, which can make such determinations.

The electronic messaging service 115 can add to an instance 170-1 of the electronic message 170 being sent to Alice the shared user contexts "Z-series," "Java Developer" and "Software Group," which relate to the topic "Product Z," as shared user contexts 310. Bob's user context indicates "Project Management," which the electronic messaging service 115 can determine also relates to "Product Z." Since Alice does not have this user context, the electronic messaging service 115 can identify "Project Management" as being an unshared user context 320 and add the unshared user context 320 of Bob to the instance 170-1 of the electronic message 170 sent to Alice.

"OAuth" can be another software product determined by the electronic messaging service 115 as not being related to "Product Z." Since the user contexts of Bob and Alice both include "OAuth," optionally, the electronic messaging service 115 also can include "OAuth" in the shared user contexts 310 added to the instance 170-1 electronic message 170. Further, "Ferraris" and "Scuba Diving" are user contexts of Bob, but not Alice. Optionally, the electronic messaging service 115 also can include "Ferraris" and "Scuba Diving" in the unshared user contexts 320 added to the instance 170-1 of the electronic message 170. In one aspect, the electronic messaging service 115 can indicate in the instance 170-1 of the electronic message 170 that "OAuth," "Ferraris" and "Scuba Diving" are not related to the topic "Product Z," for example using a suitable indicator.

Referring to FIG. 4, the electronic messaging service 115 can add the shared user contexts 310 to an instance 170-2 of the electronic message 170 saved for Bob. Alice's user context indicates "Software Development," which the electronic messaging service 115 can determine relates to "Product Z." Since Bob does not have this user context, the electronic messaging service 115 can identify "Software Development" as being an unshared user context 420 and add the unshared user context 420 of Alice to the instance 170-2 of the electronic message 170 saved for Bob. Optionally, the electronic messaging service 115 can add to the instance 170-2 of the electronic message 170 shared user contexts, as well as unshared user contexts of Alice, to the instance 170-2 of the electronic message 170.

Further, if Alice sends to Bob another electronic message in reply to the electronic message 170, the electronic messaging service 115 can add to an instance of the other electronic message sent to Bob the shared user contexts 310 and the unshared user context 420. Similarly, the electronic messaging service 115 can add to an instance of the other electronic message saved for Alice the shared user contexts 310 and the unshared user context 320.

FIG. 5 is a flow chart illustrating an example of a method 500 of presenting a shared user context to a user. At step 505, an electronic messaging service 115 can identify an electronic message comprising text generated by a first user and identifying at least a second user as a recipient. At step 510, the electronic messaging service can identify at least one n-gram contained in the text of the electronic message by performing natural language processing on the text. At step 515, the electronic messaging service can access a first user profile of the first user and a second user profile of the second user and, based on the first user profile and the second user profile, determine, using a processor, at least one shared user context of the first user and the second user relating to the at least one n-gram. At step 520, the electronic messaging service can present, to at least the second user, the at least one shared user context of the first user and the second user relating to the at least one n-gram.

Figure 6:
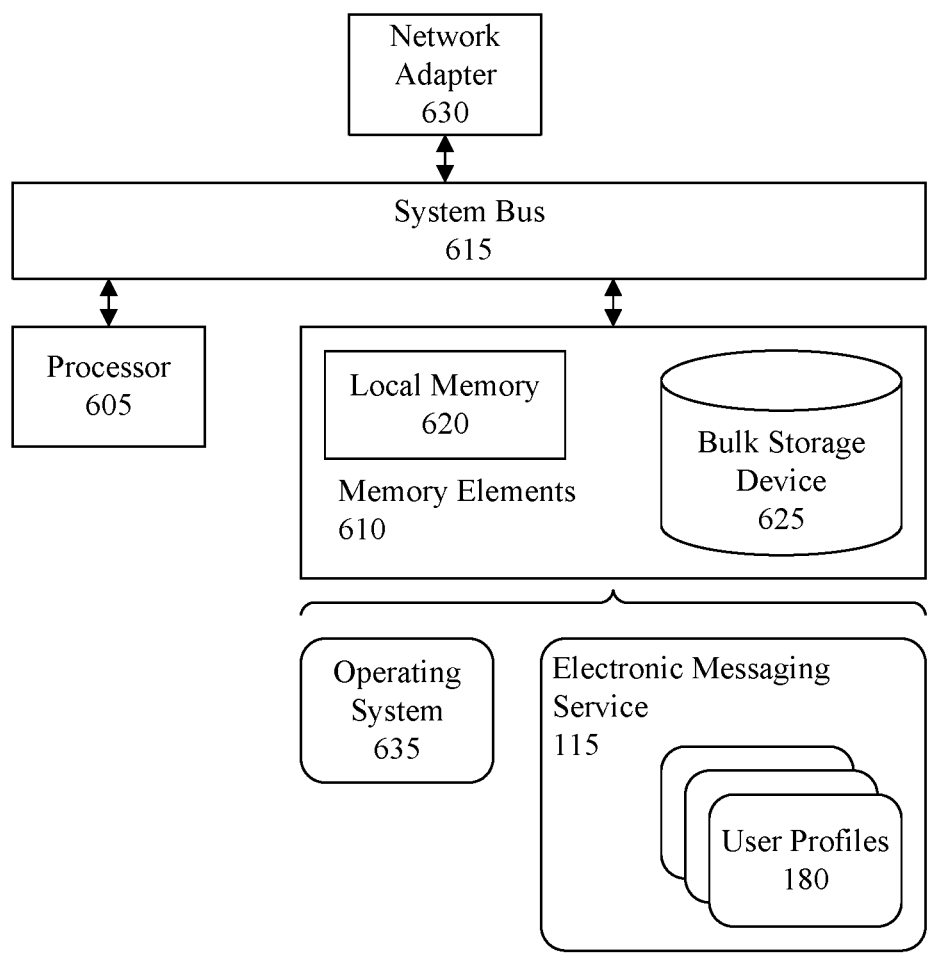
FIG. 6 is a block diagram illustrating example architecture for an electronic messaging system.

FIG. 6 depicts a block diagram of an electronic messaging system 110 configured in accordance with an arrangement disclosed within this specification. The electronic messaging system 110 can include at least one processor 605 (e.g., a central processing unit) coupled to memory elements 610 through a system bus 615 or other suitable circuitry. As such, the electronic messaging system 110 can store program code within the memory elements 610. The processor 605 can execute the program code accessed from the memory elements 610 via the system bus 615. It should be appreciated that the electronic messaging system 110 can be implemented in the form of any system including a processor and memory that is capable of performing the functions and/or operations described within this specification. For example, the electronic messaging system 110 can be implemented as a server or a plurality of communicatively linked servers.

The memory elements 610 can include one or more physical memory devices such as, for example, local memory 620 and one or more bulk storage devices 625. Local memory 620 refers to random access memory (RAM) or other non-persistent memory device(s) generally used during actual execution of the program code. The bulk storage device(s) 625 can be implemented as a hard disk drive (HDD), solid state drive (SSD), or other persistent data storage device. The electronic messaging system 110 also can include one or more cache memories (not shown) that provide temporary storage of at least some program code in order to reduce the number of times program code must be retrieved from the bulk storage device 625 during execution.

One or more network adapters 630 can be coupled to electronic messaging system 110, either directly or through intervening I/O controllers, to enable the electronic messaging system 110 to become coupled to other systems, computer systems, remote printers, and/or remote storage devices through intervening private or public networks. Modems, cable modems, transceivers, and Ethernet cards are examples of different types of network adapters 630 that can be used with the electronic messaging system 110.

As pictured in FIG. 6, the memory elements 610 can store the components of the electronic messaging system 110, namely an operating system 635 and an electronic messaging service 115. As noted, the electronic messaging service 115 can store or manage user profiles 180. Being implemented in the form of executable program code, these components of the electronic messaging system 110 can be executed by the processor 605 and, as such, can be considered part of the electronic messaging system 110. Moreover, the operating system 635, electronic messaging service 115 and user profiles 180 are functional data structures that impart functionality when employed as part of the electronic messaging system 110.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of identifying and presenting at least one shared user context in electronic communication, comprising:

identifying an electronic message comprising text generated by a first user and identifying at least a second user as a recipient;

identifying at least one n-gram contained in the text of the electronic message by performing natural language processing on the text, the natural language processing deriving a computer-understandable meaning of the at least one n-gram;

accessing a first user profile of the first user and a second user profile of the second user and, based on the first user profile and the second user profile, determining, using a processor, at least one shared user context of the first user and the second user relating to the computer-understandable meaning of the at least one n-gram;

adding, to a body of the electronic message generated by the first user, the at least one shared user context of the first user and the second user relating to the at least one n-gram;

presenting to at least the second user the electronic message, the electronic message as presented to the second user comprising the at least one shared user context of the first user and the second user relating to the at least one n-gram in the body of the electronic message;

based on the first user profile and the second user profile, determining at least one user context of the first user not shared with the second user; and adding, to the body of the electronic message generated by the first user, the at least one user context of the first user not shared with the second user, wherein the electronic message as presented to the second user further comprises, as unshared user context, the at least one user context of the first user not shared with the second user.

2. The method of claim 1, further comprising:
determining a number of active conversation threads in which the second user is participating;
wherein determining the at least one shared user context of the first user and the second user relating to the at least one n-gram is responsive to the number of active conversation threads in which the second user is participating at least equaling a threshold value.

3. The method of claim 1, further comprising:
determining whether a number of the at least one shared user context of the first user and the second user, relating to the at least one n-gram, at least equals a threshold value; and
responsive to the number of the at least one shared user context of the first user and the second user, relating to the at least one n-gram, not at least equaling the threshold value, automatically prompting the first user to add additional text to the electronic message, wherein the electronic message is an electronic mail or a text message.

4. The method of claim 1, further comprising:
determining a first date assigned to the shared user context in the first user profile; and
determining a second date assigned to the shared user context in the second user profile;
wherein determining the at least one shared user context of the first user and the second user relating to the at least one n-gram comprises determining that the first date and the second date are not older than a threshold value.

5. The method of claim 1, further comprising:
presenting, to the first user, the at least one shared user context of the first user and the second user relating to the at least one n-gram.

6. The method of claim 5, further comprising:
based on the first user profile and the second user profile, determining at least one user context of the second user not shared with the first user; and
presenting, to the first user, as unshared user context the at least one user context of the second user not shared with the first user.

7. A system for identifying and presenting at least one shared user context in electronic communication, comprising:
a processor programmed to initiate executable operations comprising: identifying an electronic message comprising text generated by a first user and identifying at least a second user as a recipient;
identifying at least one n-gram contained in the text of the electronic message by performing natural language processing on the text, the natural language processing deriving a computer-understandable meaning of the at least one n-gram;
accessing a first user profile of the first user and a second user profile of the second user and, based on the first user profile and the second user profile, determining at least one shared user context of the first user and the second user relating to the computer-understandable meaning of the at least one n-gram; and
adding, to a body of the electronic message generated by the first user, the at least one shared user context of the first user and the second user relating to the at least one n-gram;
presenting to at least the second user the electronic message, the electronic message as presented to the second user comprising the at least one shared user context of the first user and the second user relating to the at least one n-gram in the body of the electronic message;
based on the first user profile and the second user profile, determining at least one user context of the first user not shared with the second user; and
adding, to the body of the electronic message generated by the first user, the at least one user context of the first user not shared with the second user, wherein the electronic message as presented to the second user further comprises, as unshared user context, the at least one user context of the first user not shared with the second user.

8. The system of claim 7, the executable operations further comprising:
determining a number of active conversation threads in which the second user is participating;
wherein determining the at least one shared user context of the first user and the second user relating to the at least one n-gram is responsive to the number of active conversation threads in which the second user is participating at least equaling a threshold value.

9. The system of claim 7, the executable operations further comprising:
determining whether a number of the at least one shared user context of the first user and the second user, relating to the at least one n-gram, at least equals a threshold value; and
responsive to the number of the at least one shared user context of the first user and the second user, relating to the at least one n-gram, not at least equaling the threshold value, automatically prompting the first user to add additional text to the electronic message, wherein the electronic message is an electronic mail or a text message.

10. The system of claim 7, the executable operations further comprising:
  determining a first date assigned to the shared user context in the first user profile; and
  determining a second date assigned to the shared user context in the second user profile;
  wherein determining the at least one shared user context of the first user and the second user relating to the at least one n-gram comprises determining that the first date and the second date are not older than a threshold value.

11. The system of claim 7, further comprising:
  presenting, to the first user, the at least one shared user context of the first user and the second user relating to the at least one n-gram.

12. The system of claim 11, the executable operations further comprising:
  based on the first user profile and the second user profile, determining at least one user context of the second user not shared with the first user; and
  presenting, to the first user, as unshared user context the at least one user context of the second user not shared with the first user.

13. A computer program product comprising a computer readable storage medium having program code stored thereon, the program code executable by a processor to perform a method of identifying and presenting at least one shared user context in electronic communication, the method comprising:
  identifying, by the processor, an electronic message comprising text generated by a first user and identifying at least a second user as a recipient;
  identifying, by the processor, at least one n-gram contained in the text of the electronic message by performing natural language processing on the text, the natural language processing deriving a computer-understandable meaning of the at least one n-gram;
  accessing, by the processor, a first user profile of the first user and a second user profile of the second user and, based on the first user profile and the second user profile, determining, by the processor, at least one shared user context of the first user and the second user relating to the computer-understandable meaning of the at least one n-gram; and
  adding, by the processor, to a body of the electronic message generated by the first user, the at least one shared user context of the first user and the second user relating to the at least one n-gram;
  presenting, by the processor, to at least the second user the electronic message, the electronic message as presented to the second user comprising the at least one shared user context of the first user and the second user relating to the at least one n-gram in the body of the electronic message;
  based on the first user profile and the second user profile, determining at least one user context of the first user not shared with the second user; and
  adding, to the body of the electronic message generated by the first user, the at least one user context of the first user not shared with the second user, wherein the electronic message as presented to the second user further comprises, as unshared user context, the at least one user context of the first user not shared with the second user.

14. The computer program product of claim 13, the method further comprising:
  determining a number of active conversation threads in which the second user is participating;
  wherein determining the at least one shared user context of the first user and the second user relating to the at least one n-gram is responsive to the number of active conversation threads in which the second user is participating at least equaling a threshold value.

15. The computer program product of claim 13, the method further comprising:
  determining whether a number of the at least one shared user context of the first user and the second user, relating to the at least one n-gram, at least equals a threshold value; and
  responsive to the number of the at least one shared user context of the first user and the second user, relating to the at least one n-gram, not at least equaling the threshold value, automatically prompting the first user to add additional text to the electronic message, wherein the electronic message is an electronic mail or a text message.

16. The computer program product of claim 13, the method further comprising:
  determining a first date assigned to the shared user context in the first user profile; and
  determining a second date assigned to the shared user context in the second user profile;
  wherein determining the at least one shared user context of the first user and the second user relating to the at least one n-gram comprises determining that the first date and the second date are not older than a threshold value.

17. The computer program product of claim 13, the method further comprising:
  presenting, to the first user, the at least one shared user context of the first user and the second user relating to the at least one n-gram.

* * * * *